Dec. 22, 1931.  H. F. McG. MATTHEWS  1,837,278
VEHICLE
Filed Nov. 18, 1929   3 Sheets-Sheet 1

Inventor
Herbert F. McG. Matthews,

By Wilkinson & Giusta
Attorneys.

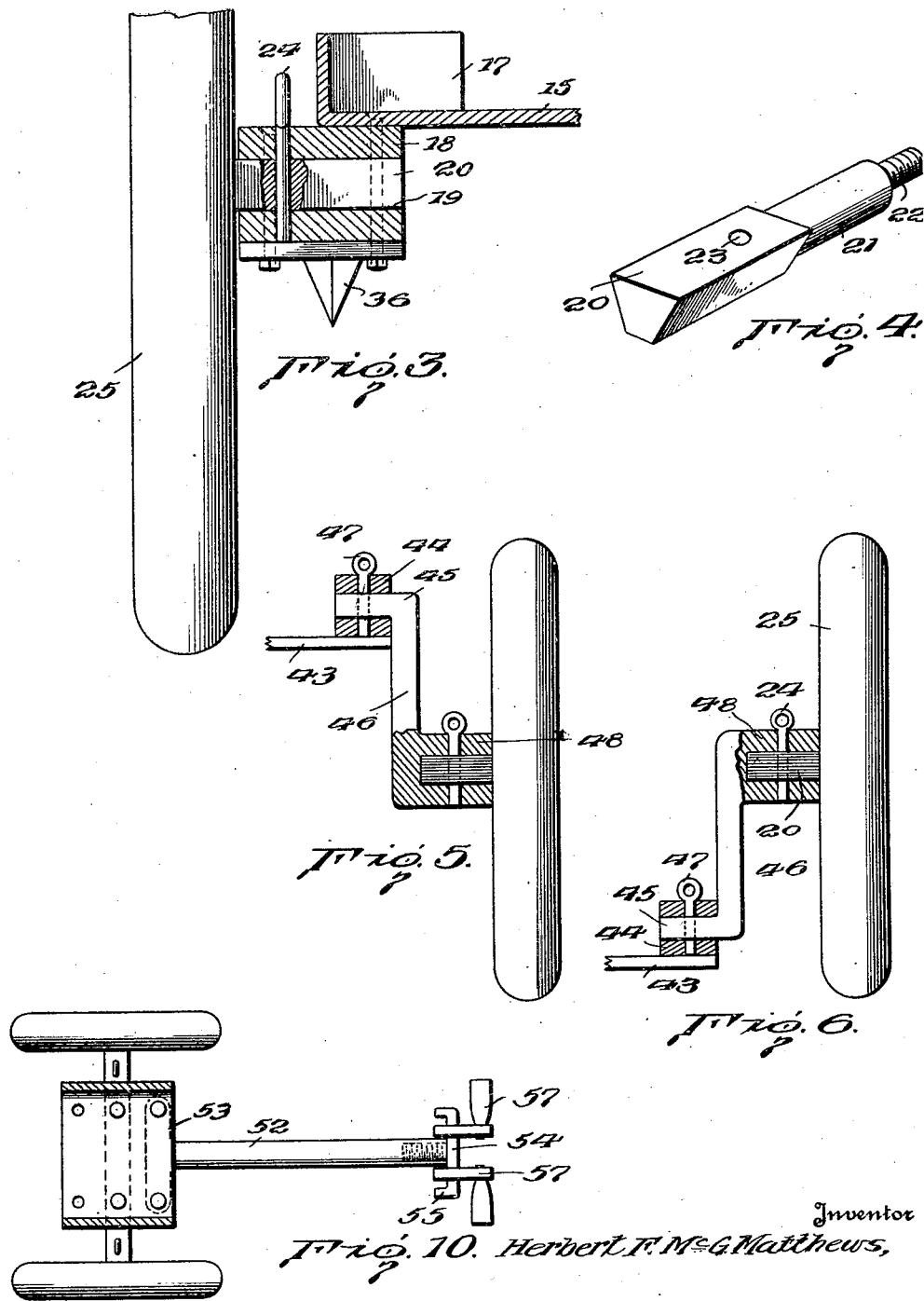

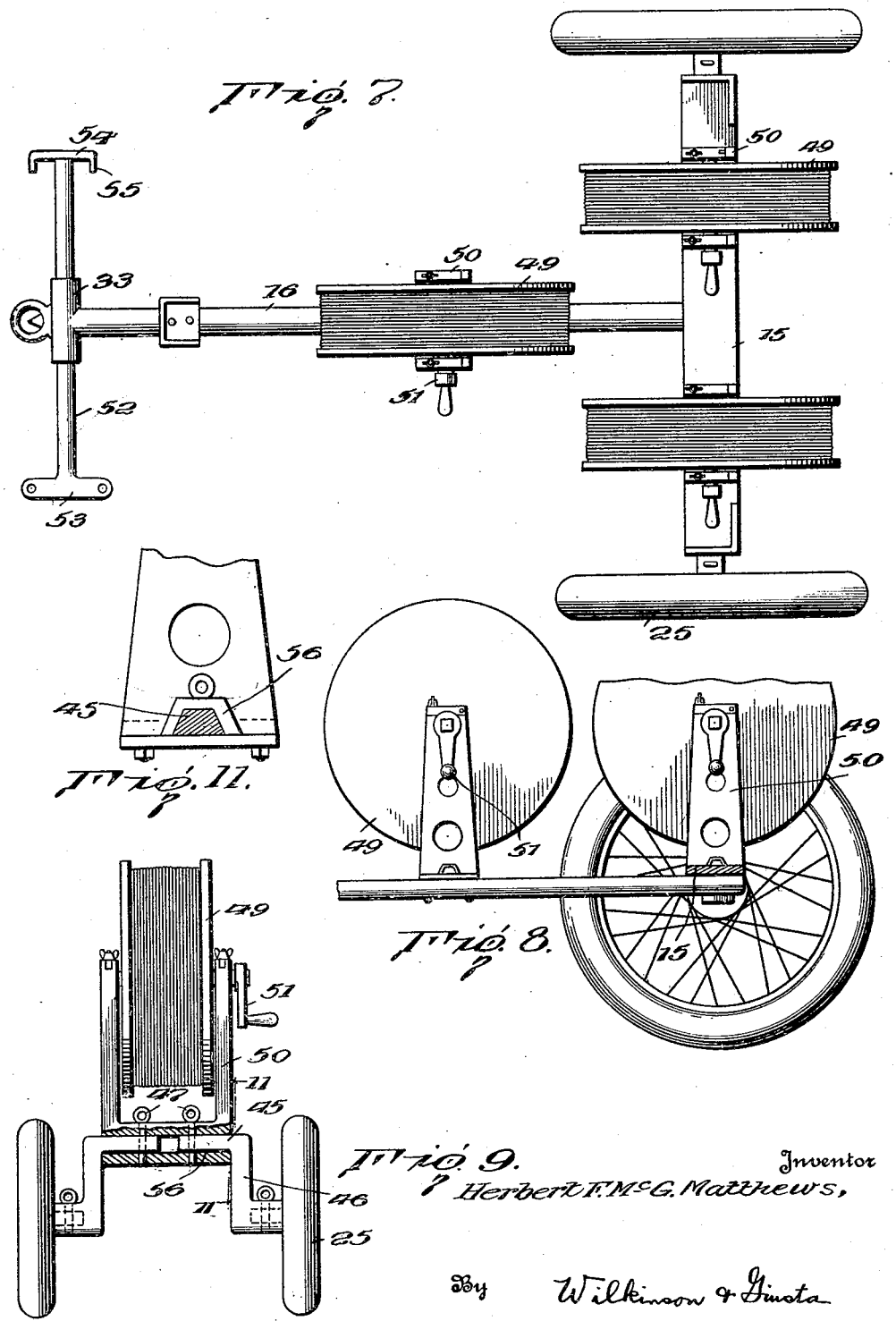

Patented Dec. 22, 1931

1,837,278

UNITED STATES PATENT OFFICE

HERBERT F. McG. MATTHEWS, OF FORT McKINLEY, RIZAL, PHILIPPINE ISLANDS

VEHICLE

Application filed November 18, 1929. Serial No. 408,063.

The present invention relates to vehicles, and more particularly to a cart adapted for use especially by the infantry in carrying and supporting machine guns, wire reels, and as a ration and ammunition cart.

An object of the present invention is to provide a cart of simplified construction which is adapted for easy transportation, whether on its own wheels or when knocked down by hand, and which is capable of quick and easy adjustment, to provide a rolling or a stationary support for machine guns, reels, or the like in accordance with the demands of the service or movements required.

Another feature of the invention is to provide a separable or knocked down cart which is so constructed that it may easily be manned by a relatively small detachment or crew and readily set up into firing position within a few seconds and thus provides a quickly and readily available support and mounting for a machine gun or the like when the infantry is on the march.

The invention has for a still further object to provide a convertible cart which is of peculiar construction, so that the usual tripod of a machine gun may be quickly mounted on the cart and quickly removed therefrom, and wherein the cart, by virtue of its peculiar construction, may be detachably secured to the wire carrying reels, ammunition cases or the like according to the various requirements of the moment met with while the infantry is in action and during other maneuvers.

A still further object of the invention is to provide a cart of this general character which embodies the above outlined features and which is composed of a number of separable parts capable of use in this combination, such as for supporting and conveying individual wire reels and which is capable of adjustment for use in using the machine gun in anti-air craft firing, and in providing a cart of this character which may be quickly and easily coupled to an ammunition cart in the usual manner.

The above, and various other objects and advantages of this invention will in part be described in, and in part be understood from, the following detailed description of the present preferred embodiment, the same being illustrated in the accompanying drawings, wherein:—

Figure 3 is a fragmentary enlarged section taken through one side of the cart showing the detachable wheel for supporting the same.

Figure 4 is a detail perspective view of one of the wheel spindles and its removable shank.

Figure 5 is a sectional view taken through one side of the cart showing a slight modification wherein a crank hanger socket is interposed between the cart frame and the wheel for changing the elevation of the cart frame, the view showing the frame elevated.

Figure 6 is a similar view with the crank hanger in reverse position and wherein the frame is lowered.

Figure 7 is a top plan view of the cart having wire reels mounted thereon and having a handle bar attached to a trail leg of the frame.

Figure 8 is a side elevation, partly in section of the same.

Figure 9 is a side elevation of the parts of the cart adjusted to support a single reel.

Figure 10 is a horizontal section taken through the same with the reel removed, and Figure 11 is a fragmentary sectional view taken through one side of the reel support shown in Figure 9, substantially on the line 11—11.

Figure 1:
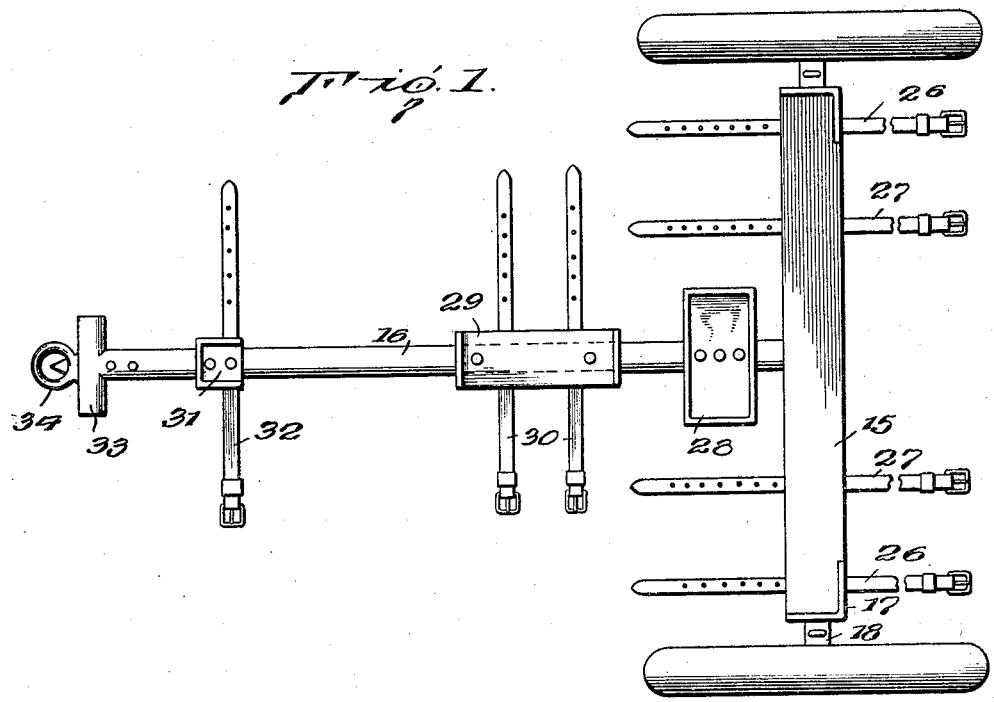
Figure 1 is a top plan view of a combined machine gun and reel cart constructed according to the present invention.

Referring now to the drawings, and first to the form and adjustment of the invention as shown in Figures 1, 2, 3 and 4, the cart is provided with a main frame of substantially T-shape having a front cross sill 15 and a trail or tongue piece 16 which is branched from the sill piece and comprises therewith the main parts of the frame. The sill 15 is preferably of flat construction to present an upper bearing or carrying surface, and at opposite ends the sill is provided with stirrups 17 in the form of upstanding rectangular flanges bordering the end and forward edges of the sill 15.

Figure 2:
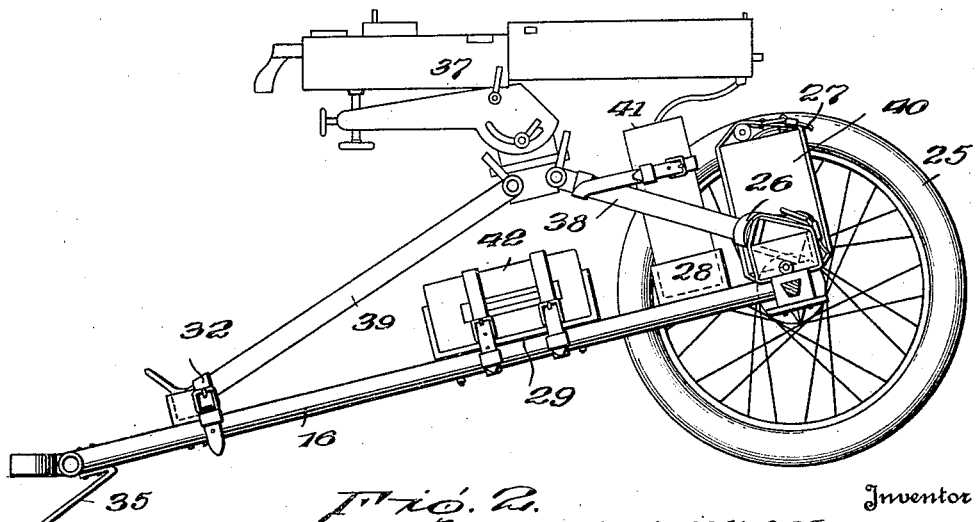
Figure 2 is a side elevation of the same, supporting a machine gun and its equipment.

The trail 16 may be integral with the cross sill 15, or be a separate part suitably secured thereto. The sill 15 has at its under side and its opposite ends axle socket housings 18. Each housing 18, as shown in Figures 2 and 3, may comprise a block bolted or otherwise suitably secured beneath the adjacent ends of the sill 15, and which has a non-circular socket or opening 19 therethrough leading in horizontal direction and with their axes lengthwise of the cross sill. The socket opening 19 may be given any suitable configuration for the purpose of slidably receiving therein a non-circular shank 20 carried upon the inner end of an axle spindle 21, the latter having a threaded nut receiving section 22, as shown to advantage in Figure 4.

The shank 20 is provided preferably with flat sides having its uppermost face relatively broad for taking up the wear and strain between the parts, and the socket 18 and the shank 20 are provided with registering vertically disposed openings 23 into which is detachably engaged a locking pin 24, the latter having a handle or eye upon its upper end to facilitate the removal and positioning of the pin 24. This single pin 24 is located outwardly beyond the adjacent stirrups 17, as shown in the drawings, so that the pin may be readily grasped by the fingers and quickly removed when it is desired to detach the axle 21 from the frame.

The axle 21 carries a supporting wheel 25 of any suitable type, and as shown in the present instance, of wire spoke construction and equipped with a pneumatic tire, and which may be a wheel of the type used on motor cycle side cars. However, it is understood that the wheel 25 may be of any approved and suitable construction.

The cross sill 12 is adapted to carry various articles and implements and for the purpose of securing the same in suitable position upon the sill, the latter is provided with a pair of straps 26, one disposed across the under side of each stirrup 17, and the sill is further provided with a second pair of straps 27 disposed inwardly in slightly spaced relation to the outer straps 26.

The trail 16 is provided upon its upper side and adjacent to the sill 15 with a bracket or box 28 disposed lengthwise across the trail 16 and secured thereto by bolts or the like, as shown in Figure 1. A second bracket 29 is secured to the trail 16 in spaced relation to the bracket 28 and is provided across its under side with a pair of straps 30, the bracket 29 being disposed to receive ammunition cases or the like and the straps 30 being proportioned to engage about the ammunition case or box and hold it to the bracket 29.

The trail 16 is provided near its outer end with a stirrup 31 which opens forwardly toward the cross sill 15 and which is provided therebeneath with a cross strap 32 for holding objects in the stirrup, as will later appear. The extreme outer end of the trail 16 is provided with a hollow T head 33 which extends transversely of the trail 16 and adapted to receive a bar or the like for facilitating the handling of the cart when the same is detached from an ammunition cart or the like. The T head 33 carries a ring or lunette 34 adapted to couple the cart of this invention to an ammunition cart by the usual removable artillery pin and in the usual manner.

The outer end of the trail 16 is provided at its under side with a spade or anchor 35 which extends rearwardly and downwardly at an angle to the trail 16 so that when the cart is used as a gun carriage the spade 35 may engage in the ground and anchor the cart rigidly in place.

The cross sill 15 is provided, preferably beneath each socket 18, with a ground spike 36 having a base plate by means of which the spike is attached by bolts or the like in position beneath the cross sill. The ground spikes 36 are adapted for use in holding the frame in fixed position upon the ground when the wheels 25 are removed and not in use.

From Figure 2 it will be noted that when the cart is used as a carriage for a machine gun 37, the forward legs 38 of the tripod of the machine gun are seated at their lower ends in the socket 17 and are held in such position by the straps 26. The rear leg 39 of the tripod is seated in the rear socket 31 and held therein by the strap 32.

Figure 2 also shows ammunition boxes 40 seated on the sill 15 between the legs 38 of the tripod, the straps 27 securing the ammunition boxes 40 detachably in position. The bracket 28 supports in proper position the water can 41 used in supplying the machine gun 37 with the cooling medium required, and the bracket 29 supports a suitable packing case 42 for ammunition, spare parts or the like as may be required.

It is apparent that when it is desired to seat the frame flat upon the ground it is only necessary for a gun crew to elevate the frame slightly, remove the pins 24 from the sockets 18, and withdraw the shanks 20 from the sockets 18, at which time the wheels 25 may be carried to a remote spot and the frame be eased down upon the ground with the spurs 36 engaging in the ground and holding the frame from shifting. The spade 35 also serves as an anchor for the rear end of the trail 16.

Referring now to Figures 5 and 6, the cross sill 43 may have at its end a socket 44 to receive the crank portion 45 of a crank hanger 46. The crank portion 45 and the socket 44 have registering apertures to receive the pin 47 which detachably interlocks the parts and holds the crank hanger 46 in either the depending position shown in Figure 5 or in the upturned position shown in Figure 6. The free end of the crank hanger 46 is provided with a non-circular socket 48 which corresponds to the socket 18 in Figure 3 and which is adapted to detachably receive the crank 20 which connects the wheels 25 to the frame. By use of the crank hanger 46 the frame may be adjusted into raised position above the axes of the wheels 25, as shown in Figure 5, or the frame may be suspended into close proximity with the ground as shown in Figure 6 by merely reversing the position of the crank portion 45 of the crank hanger in its socket 44.

Referring now to Figures 7 and 8, the cross sill 15 is used for carrying a number of wire reels 49 for carrying electric wires adapted for use in establishing lines of communication between various field points. Each reel 49 is provided with a U-shaped bracket 50, the base of which is flat and adapted to seat upon the sill 15 and is secured thereto by bolts or the like which facilitate the quick and easy removal and positioning of the reels with respect to the cart. It will be noted that the trail 16 is provided with one of the reels 49. The bracket 50 of this reel is secured to the trail 16 by bolts or the like in a manner similar to the attachment of the other bracket.

The reels are secured to the cart with their axes transverse to the cart so that the wire may be readily drawn off from the reels, whether by drawing the wire itself or by anchoring the wire and drawing the cart. This arrangement also facilitates the rewinding of the wire on the reels by means of the crank handle 51 provided on each reel.

In Figure 7 the hollow T head 33 is provided with a pulling bar 52 which is of suitable length to extend crosswise of the cart and admit of grasping at opposite sides thereof for manually moving the cart when it is necessary. The pulling bar 52 has at one end an integral flat T head 53 suitably apertured for receiving various attachments hereinafter referred to, and at the other end the rod 52 is provided with a removable T head 54 which may have a threaded shank or the like to enable the quick and easy positioning and removal of the bar 52 with respect to the hollow T head 33. The removable T head 54 is provided with inwardly directed tongues or projections 55 for a purpose which will hereinafter appear, and also for facilitating the grasping of the end of the pulling bar 52 when manipulating the cart.

Where it is desired to carry a single wire reel 49 in its bracket 50, and where the passage through which the reel is to be carried is relatively narrow, the crank hangers 46 may be utilized as the crank portions 45 thereof may be inserted in the opposite ends of a through socket 56 which is formed transversely through the base portion of the bracket 50.

The crank hangers 56 are positioned to extend downwardly and receive the wheels 25 thereon, as shown in Figure 9, so that the carriage thus provided is of narrow gauge and the reel 49 is supported at sufficient height above the wheels 25 to admit of the quick and easy operation of the reel.

With this adjustment of the parts the pulling bar 52 is removed from the hollow T head 33 and is bolted by means of its flat T head 53 beneath one end of the bracket 50, as shown in Figure 10, so that the pulling bar 52 may be used as a tongue for the carriage. In this instance, the detachable head 54 of the pulling bar is provided with a pair of detachable handles 57 which may have apertured shanks for fitting over the lugs 55 and over the opposite ends of the T head 54. The handles 57 may be quickly removed from the T head 54.

In use, the cart may be employed as a machine gun carriage, as shown in Figures 1 and 2. In this instance the T frame is composed of the cross sill 15 and the trail 16 which may be mounted upon the wheels 25 and be equipped with the machine gun 37 and its tripod. From Figure 3 it will be noted that when the trail 16 is lowered to the ground the spade or anchor point 35 penetrates the earth and serves to hold the cart from movement under the recoil action of the gun.

It is apparent that the cart may be attached to the ammunition cart in the usual manner and trailed behind the same in the line of march. When it is desired to go into action the trail 16 may be quickly uncoupled from the ammunition cart and the vehicle of this invention be manipulated into proper position for adjustment, as shown in Figure 2, so that the machine gun 37 is supported in proper position for use. If it is desired to operate the gun 37 from a low level, the cart may be manned by a gun crew for removing the wheels 25 by merely withdrawing the pins 24 from the sockets 18 and the T frame with the machine gun thereon be lowered to the ground.

Another use of the cart of this invention is in carrying electric wire on reels as shown in Figures 7 and 8. In this invention the reels may be quickly mounted on the T frame and the latter be manned in desired manner, with or without the wheels 25, to carry and support the wire reels 49. The pulling bar 52 may of course be connected to the trail 16 at any time desired for facilitating the grasping of the cart by several men in the gun crew.

As shown in Figures 9 and 10, the wheels and attachments for the cart may be assembled with respect to one of the reels 49 so as to carry it and provide a carriage or vehicle of very narrow gauge which may be operated by one man through a narrow pass or under such conditions whereby one reel of wire is required.

Figures 5 and 6 show to advantage how the parts of the cart may be adjusted to support the T frame in either raised or lowered positions with respect to the axis of the wheel support.

It is of course understood that various changes and modifications may be made in the details of design and construction of the several parts which comprise the improved cart without departing from the spirit of this invention, and that the modifications may be made within the scope of the following claims.

What I claim is:—

1. A machine gun and reel cart comprising a T frame including a cross sill and a trail, stirrups carried by the cross sill and trail adapted to receive the feet of a machine gun tripod, means for securing said feet in the stirrups, and wheel elements detachably mounted upon the opposite ends of the cross sill.

2. A machine gun and reel cart comprising a T frame, wheels mounted upon the opposite ends of the cross member of the frame, a spade projecting downwardly from the longitudinal member of the T frame for engaging the ground to anchor the frame against movement, and ground spurs carried beneath the cross member of the T frame for engaging the ground when the wheel elements are removed.

3. A machine gun and reel cart comprising a T frame including a cross member and trail, sockets carried upon the opposite ends of the cross member, spindles having shanks removably fitting in the sockets and carrying wheels for supporting the cross sill, vertically disposed pins removably engaging through the sockets and the spindle shanks to lock the latter in the sockets, stirrups carried by the cross sill and the trail for receiving the feet of a machine gun tripod, and a hollow T head on the end of the trail provided with a lunette for connecting the trail to a source of traction or the like.

4. A machine gun and reel cart comprising a T frame having a cross sill and a trail, said frame adapted to support objects upon its upper side and provided at the opposite ends of the cross sill with sockets, detachable elements mounted in the sockets and arranged to carry wheels for supporting the frame, means for detachably holding the wheels to the frame, an anchor spade beneath the rear end of the trail, and ground spurs beneath the cross sill, said spade and spurs adapted to enter the ground and anchor the frame from shifting when the wheels are removed.

5. A machine gun and reel cart comprising a T frame, wheels detachably mounted on the frame, reel brackets mounted on the frame and having wire reels thereon, and a pulling bar detachably connected to the frame for facilitating the support and draft of the frame.

6. In combination with a cart having a T frame and sockets at opposite sides of the frame, crank hangers removably mounted in the sockets and having sockets on their outer ends, wheel spindles having wheels thereon and detachably fitting in said second sockets, and reels with brackets mounted on said frame, each of said brackets having a socket opening through the base thereof and said crank hangers adapted for detachable engagement in the opposite ends of a socket opening of one of said reel brackets for individually supporting the same.

7. A machine gun and reel cart comprising a T frame having a cross sill and a trail, said cross sill having a non-circular socket at each end and the trail having a hollow T head at its rear end, a pair of spindles each having a non-circular shank for engagement in the sockets, coupling pins detachably engaging in the sockets and shanks for interlocking the same together, wheels carried by the spindles, said frame having stirrups thereon for receiving the feet of a machine gun tripod, securing devices carried by the frame adjacent the stirrups for engaging the tripod to hold the machine gun to the frame, and brackets mounted on the frame between the stirrups for supporting the machine gun attachments.

8. A machine gun and reel cart comprising a T frame, including a cross member and trail, perforated socket members carried upon the opposite ends of the cross member, spindles having perforated shanks removably fitting in the sockets and carrying wheels for supporting the cross member, vertically disposed pins removably engaging through the sockets and the spindle shanks to locate the latter in the sockets, stirrups carried by the cross member and the trail for receiving the feet of a machine gun tripod, and a hollow T head on the end of the trail provided with a lunette for connecting the trail to a source of traction.

HERBERT F. McG. MATTHEWS.